United States Patent
Kobayashi et al.

(10) Patent No.: US 9,682,427 B2
(45) Date of Patent: Jun. 20, 2017

(54) HOLDER AND CUTTING TOOL

(75) Inventors: Youji Kobayashi, Satsumasendai (JP); Koji Enami, Yamato (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 443 days.

(21) Appl. No.: 14/241,405

(22) PCT Filed: Jul. 31, 2012

(86) PCT No.: PCT/JP2012/069418
§ 371 (c)(1),
(2), (4) Date: Jul. 10, 2014

(87) PCT Pub. No.: WO2013/031457
PCT Pub. Date: Mar. 7, 2013

(65) Prior Publication Data
US 2014/0377019 A1    Dec. 25, 2014

(30) Foreign Application Priority Data

Aug. 26, 2011  (JP) ................................. 2011-184916
Jun. 28, 2012  (JP) ................................. 2012-145741

(51) Int. Cl.
*B23B 29/04*    (2006.01)
*B23B 27/10*    (2006.01)
(Continued)

(52) U.S. Cl.
CPC ............ *B23B 27/10* (2013.01); *B23B 27/007* (2013.01); *B23B 27/16* (2013.01); *B23B 29/04* (2013.01);
(Continued)

(58) Field of Classification Search
CPC ......... B23B 27/10; B23B 27/16; B23B 29/02; Y10T 407/14; Y10T 407/22; Y10T 407/26
See application file for complete search history.

(56) References Cited

U.S. PATENT DOCUMENTS 3,912,413 A * 10/1975 Werther ................ B23B 27/007
                                                    408/143
4,211,510 A *  7/1980 Hopkins ........... B23B 29/03428
                                                    279/103
(Continued)

FOREIGN PATENT DOCUMENTS

CN          101888912 A       11/2010
DE          GB 2228695 A  *   9/1990  ............ B23B 27/007
(Continued)

OTHER PUBLICATIONS

JP 2002-233911 Machine Translation, pp. 3-7, May 12, 2016.*
(Continued)

*Primary Examiner* — Daniel Howell
*Assistant Examiner* — Nicole N Ramos
(74) *Attorney, Agent, or Firm* — Viering, Jentschura & Partner mbB

(57) ABSTRACT

A holder and a cutting tool with the holder including an insertion hole at a front end part thereof, and a cutting insert that includes a cutting edge part and a shank part. The shank part has substantially a rod shape. A part of the shank part is immovably located in the insertion hole. The front end part of the holder includes a first curved surface part that becomes wider from a front end toward a back side when viewed from a side thereof. The first curved surface part includes: a curved line that extends from an edge of an opening of the insertion hole toward the back side; or a straight line that extends from the edge of the opening of the
(Continued)

insertion hole and connects to a curved line that extends continuously from the straight line toward the back side without an angular part.

14 Claims, 7 Drawing Sheets

(51) Int. Cl.
    *B23B 27/00*     (2006.01)
    *B23B 27/16*     (2006.01)
    *B23B 29/12*     (2006.01)

(52) U.S. Cl.
    CPC .......... *B23B 29/12* (2013.01); *B23B 2200/08* (2013.01); *B23B 2270/20* (2013.01); *Y10T 407/14* (2015.01); *Y10T 407/22* (2015.01); *Y10T 407/26* (2015.01)

(56) References Cited

U.S. PATENT DOCUMENTS

| | | | | |
|---|---|---|---|---|
| 4,795,292 A * | 1/1989 | Dye | ..................... | B23Q 1/0036 279/20 |
| 5,388,487 A * | 2/1995 | Danielsen | ................ | B23B 29/04 279/2.08 |
| 6,126,365 A * | 10/2000 | Okawa | .................. | B23B 27/007 407/100 |
| 7,240,593 B2 * | 7/2007 | Little | ....................... | B23B 27/10 407/101 |
| 7,371,032 B2 * | 5/2008 | Jansson | ................. | B23B 27/007 407/11 |
| 8,302,515 B2 * | 11/2012 | Travez | .................... | B23B 29/04 407/102 |
| 2004/0047699 A1 | 3/2004 | Travez et al. | | |
| 2010/0260558 A1 | 10/2010 | Kress | | |
| 2010/0322722 A1 * | 12/2010 | Lin | ........................ | B23B 27/007 407/11 |
| 2011/0064529 A1 * | 3/2011 | Guy | ....................... | B23B 27/007 407/108 |
| 2011/0158755 A1 | 6/2011 | Churlet | | |
| 2011/0243674 A1 * | 10/2011 | Kitagawa | .............. | B23B 27/007 408/199 |

FOREIGN PATENT DOCUMENTS

| | | | |
|---|---|---|---|
| JP | 2000042820 A | | 2/2000 |
| JP | 2002233911 A | * | 8/2002 |
| JP | 2003053603 | | 2/2003 |
| JP | 2004216495 | | 8/2004 |
| JP | 2005186201 A | | 7/2005 |
| JP | 2010240817 | | 10/2010 |
| WO | 2010031946 | | 3/2010 |

OTHER PUBLICATIONS

English Translation of International Search Report issued in PCT/JP2012/069418 dated Oct. 15, 2012.

Concise explanation of the Office Action issued in the corresponding Japanese Patent Application No. 2013-531181 dated Dec. 1, 2014.

* cited by examiner (a)

(b)

(c)

(a)

(b)

HOLDER AND CUTTING TOOL

CROSS-REFERENCE TO RELATED APPLICATIONS

This application is a national phase of the International application PCT/JP2012/069418 filed Jul. 31, 2012 that claims priority from the Japanese patent application 2011-184916 filed Aug. 26, 2011 and Japanese patent application 2012-145741 filed Jun. 28, 2012. The contents of these aforementioned documents is herewith incorporated by reference.

TECHNICAL FIELD OF THE INVENTION

The present invention relates to a holder to which a cutting insert is attached to use the holder as a cutting tool and to a cutting tool.

BACKGROUND OF THE INVENTION

As a cutting tool used for inside diameter boring and grooving, a cutting tool has been known in which a substantially rod-shaped cutting insert having a cutting edge part (simply referred to below as the cutting insert) is inserted into a hole in a holder and a bolt is tightened to secure the insert.

Japanese Unexamined Patent Application Publication No. 2003-053603 and Japanese Unexamined Patent Application Publication No. 2010-240817, for example, disclose a cutting tool in which a substantially rod-shaped cutting insert having a cutting edge part at its front end is inserted from the front end of a holder into a hole and the side of the cutting insert is secured with a screw member passing through the holder.

The following is a list of the aforementioned background art
PTL 1: Japanese Unexamined Patent Application Publication No. 2003-053603
PTL 2: Japanese Unexamined Patent Application Publication No. 2010-240817

SUMMARY OF INVENTION

Technical Problem

However, the holders in Japanese Unexamined Patent Application Publication No. 2003-053603 and Japanese Unexamined Patent Application Publication No. 2010-240817 have a shape with an angular part 50 on the front end side as illustrated in FIG. 7, so even if a coolant (cutting fluid) is supplied toward the front end of the holder and the cutting insert that follows the front end, the direction of the coolant is changed at the angular part 50. This has prevented the coolant from being efficiently supplied to the cutting edge part of the cutting insert. In the shapes illustrated in FIG. 7, a flat part having a wide area is present, so when cutting chips ejected from the cutting edge part of the cutting insert strike against the front end of the holder, they cannot flow smoothly toward the back. Therefore, there has been a case in which the holder is clogged at the front end with cutting chips or cutting chips are caught there.

An object of the present invention is to provide a holder and a cutting tool that can efficiently supply a coolant to the cutting edge part of a cutting insert and have a superior capability of ejecting cutting chips.

SUMMARY OF THE INVENTION

The holder in the prevent invention is a holder used to insert a cutting insert having a substantially rod-shaped shank part and a cutting edge part into a cutting insertion hole at a front end part and to secure the cutting insert, and the front end part includes a first curved surface part that becomes wider from a front end toward a back side when viewed from its side and includes: a curved line that extends from an edge of an opening of the insertion hole toward the back side; or a straight line that extends from the edge of the opening of the insertion hole and a curved line that extends continuously from the straight line toward the back side without an angular part.

In addition, the cutting tool in the present invention is a cutting tool in which a cutting insert having a substantially rod-shaped shank part and including a cutting edge part is inserted into an insertion hole in the holder from an end opposite to an end at which the cutting edge part is attached and is secured.

With the holder and cutting tool in the present invention, the front end shape of the holder includes a first curved surface part that becomes wider toward the back when viewed from its side and has a curved line that extends from the edge of the opening of the insertion hole in the cutting insert toward the back or has a straight line that extends from the edge of the opening of the insertion hole in the cutting insert and a curved line that extends continuously from the straight line toward the back without an angular part. Accordingly, when a coolant (cutting fluid) is supplied to the front end of the holder and the cutting insert that follows the front end, since there is no angular part by which the direction of the coolant is changed at the front end of the holder, the coolant flows in a desired direction or the coolant can be efficiently supplied from the front end of the holder through the shank part of the cutting insert to the cutting edge part of the cutting insert. When cutting chips ejected from the cutting edge part of the cutting insert strike against the front end of the holder, the cutting chips smoothly flow toward the back, increasing the capability of ejecting cutting chips.

DETAILED DESCRIPTION OF THE DRAWINGS

A cutting tool 10 for inside diameter machining will be described with reference to FIGS. 1 to 6; the cutting tool 10 is used with a cutting insert 1 attached to a holder 20, which is an embodiment of the cutting tool in the present invention.

Figure 1:
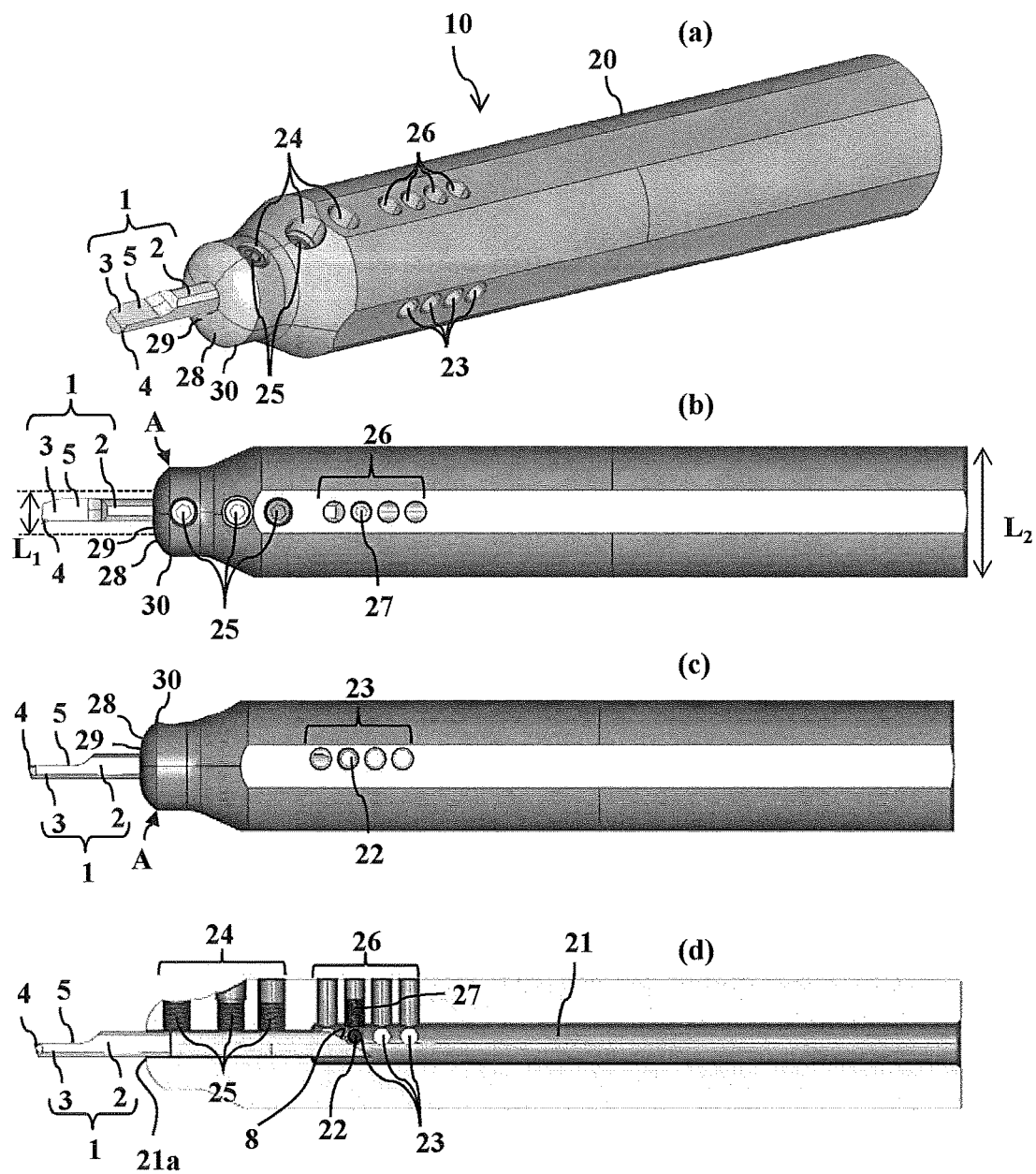
FIG. 1(a) is perspective view of a cutting tool in which a cutting insert has been attached to a holder in this embodiment.
FIG. 1(b) is a plan view of the cutting tool.
FIG. 1(c) is a side view of the cutting tool.
FIG. 1(d) is a cross sectional view of the cutting tool.

In the cutting tool 10 in FIG. 1, the cutting insert 1 has a shank part 2, which is substantially rod-shaped with a substantially circular transverse plane, and also has a cutting edge part 3, which is provided at an end that follows the shank part 2 and has a cutting edge ridge 4 extending toward the side of the shank part 2; a corner on the outer circumferential side of the cutting edge ridge 4 of the cutting edge part 3 extends toward the outer circumferential side of a rod-shaped body.

Figure 2:
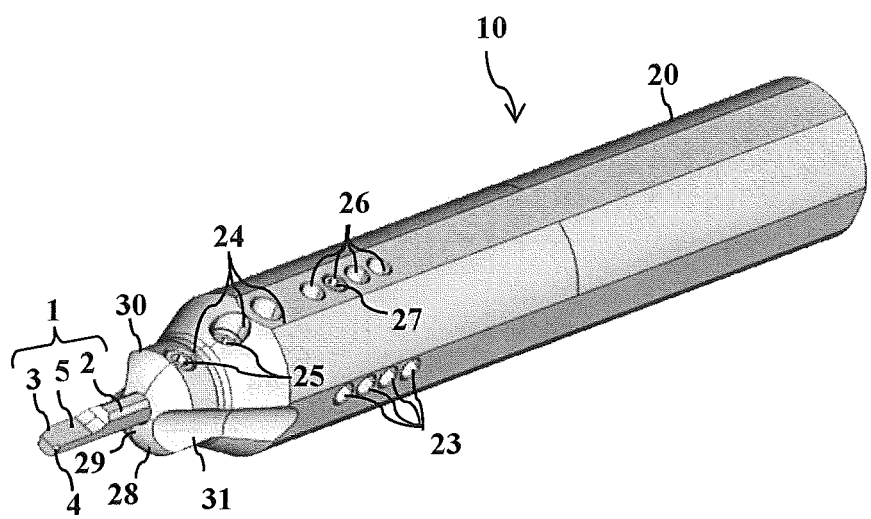
FIG. 2 is a perspective view of another cutting tool in which a cutting insert has been attached to another holder in this embodiment.
Figure 3:
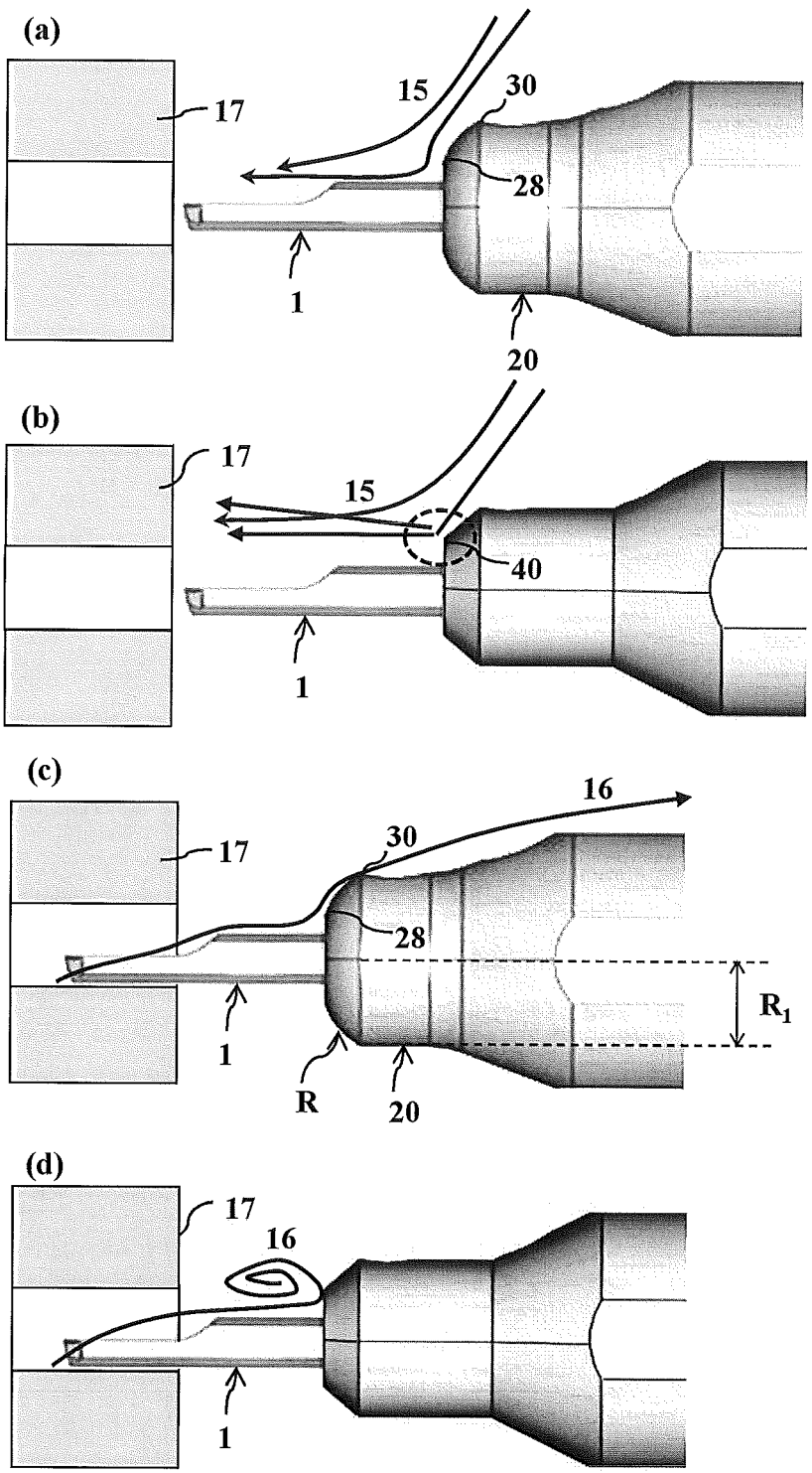
FIG. 3(a) illustrates a flow of a coolant when the coolant flows toward the front end of the holder of the cutting tool in FIG. 1 and the cutting insert that follows the front end.
FIG. 3(b) illustrates a flow of a coolant when the coolant flows toward the front end of the holder of a conventional cutting tool and the cutting insert that follows the front end.
FIG. 3(c) illustrates a flow of cutting chips created during cutting by the cutting tool in FIG. 1.
FIG. 3(d) illustrates a flow of cutting chips created during cutting by the conventional cutting tool.

The holder 20 has an elongated insertion hole 21 extending from the front end, as illustrated in FIG. 1. The cutting insert 1 can be inserted into the insertion hole 21 from an end opposite to an end at which the cutting edge part 3 is provided. As illustrated in FIGS. 1 and 2, a first curved surface part 28, which becomes wider from the front end toward the back when viewed from its side, is present at the front end part of the holder 20; at the most front end, that is, at the opening 21a of the insertion hole 21, the first curved surface part 28 has a curved line that extends from the edge of the opening 21a toward the back or has a straight line 29 that extends from the edge of the opening 21a and a curved line that extends continuously from the straight line 29 toward the back without an angular part. In other words, the outermost shape of the first curved surface part 28 is substantially circular when viewed from the front end, its diameter becomes larger from the front end toward the back, and there is no angular part at the front end part of the holder 20. Accordingly, when a coolant (cutting fluid) is supplied toward the front end of the holder 20 and the cutting insert 1 that follows the front end, since there is no angular part, by which the direction of the coolant is changed, at the front end of the holder 20 as illustrated in FIG. 3(a), the coolant 15 flows in a desired direction toward the cutting edge part 3 of the cutting insert 1 or the coolant 15 can be efficiently supplied from the front end of the holder 20 through the shank part 2 of the cutting insert 1 to the cutting edge part 3 of the cutting insert 1. By contrast, with a conventional cutting tool having an angular part 40 at the front end of the holder 20 as illustrated in FIG. 3(b), the coolant 15 changes its direction by, for example, being repelled by the angular part 40, so the coolant 15 flows in a direction away from the cutting edge part 3 of the cutting insert 1 and strikes against a wall surface other than in the machined hole in a work material 17, preventing the coolant 15 from being efficiently supplied. As for the capability of ejecting cutting chips, in a case in which there is no angular part at the front end of the holder 20 in FIG. 3(c), cutting chips 16 smoothly flow toward the back. By contrast, in a case in which there is an angular part at the front end of the holder 20 in FIG. 3(d), a clog of the cutting chips 16 may occur at a place closer to the front end than the holder 20 is. Although, in FIGS. 1 to 3, the first curved surface part 28 has a convex curved surface, the first curved surface part 28 may be a concave curved surface.

In the aspect in which the diameter becomes larger from the front end toward the back, a case is also included in which the diameter becomes larger at the same distance from the front end in the axial direction as in a case in which, for example, the first curved surface part 28 has the straight line part 29. The whole of the front end part may be like a rod in a substantially circular shape when viewed from the front end, but may be like a quadratic prism or the like.

To increase strength at a portion at which the insertion hole 21 at the front end is formed to suppress the holder 20 from being warped by a force applied to the cutting insert 1, the holder 20 may have the straight line part 29 when viewed from the front end. In this case, it is desirable that the width $L_1$ of the straight line part 29 be a half of the maximum width $L_2$ of the holder 20 or less ($L_1/L_2<1/2$) from the viewpoint that the direction of the coolant 15 is easily controlled and the capability of ejecting cutting chips is increased. The outer circumference of the straight line part 29 is in a circular or elliptical doughnut shape when viewed from the front end of the holder 20. The straight line part 29 is not necessarily present; a curved surface may be formed directly from the edge of the opening 21a of the insertion hole 21 at the front end of the holder 20.

In this embodiment, as illustrated in FIG. 3(c), the ratio $R/R_1$ of the curvature radius R of the first curved surface part 28 to a radius $R_1$ at the outermost shape A (that is, at the back end) of the first curved surface part of the holder 20 is 0.2 to 1. Thus, the coolant can be efficiently supplied to the cutting edge part 3 of the cutting insert 1. In this embodiment, a screw hole 24, which will be described later, is provided behind the first curved surface part 28, and a screw member 25 is inserted into the screw hole 24 and is then tightened to secure the side of the cutting insert 1 by restraining it. In this case, if the ratio $R/R_1$ is 0.2 to 1, the distance from the cutting edge part 3 of the cutting insert 1 to the position at which the side of the cutting insert 1 is restrained is not long, so a force with which the side of the cutting insert 1 is restrained is high and the occurrence of chatter at the cutting edge part 3 can also be suppressed. A desirable range of the ratio $R/R_1$ is 0.4 to 0.95.

At least the first curved surface part 28 of the holder 20 may be covered by a coating layer (not illustrated). This can suppress cutting chips from being melted and adhering, so the capability of ejecting cutting chips can be further increased. The coating layer may be provided a portion other than the first curved surface part 28.

A second curved surface part 30 may be provided behind the first curved surface part 28. It is desirable for second curved surface part 30 to have no angular part as much as possible before the diameter of the second curved surface part 30 is increased to the maximum width $L_2$ of the holder 20. A portion between the first curved surface part 28 and the second curved surface part 30 may be a flat surface or may be a curved surface.

In addition, as illustrated in FIG. 2, a groove part 31 may be formed in part of the first curved surface part 28 of the holder 20 so that the orientation on the front end side crosses the axial line of the holder 20 when viewed from the front end. Due to the groove part 31, the coolant 15 can more reliably strike against the cutting edge part 3 of the cutting insert 1, and the groove part 31 also functions as a guide that controls a direction in which cutting chips proceed. The groove part 31 may extend to the insertion hole 21. To improve the strength of the front end of the holder 20 around the insertion hole 21, however, the groove part 31 preferably extends to a position behind the insertion hole 21.

Figure 4:
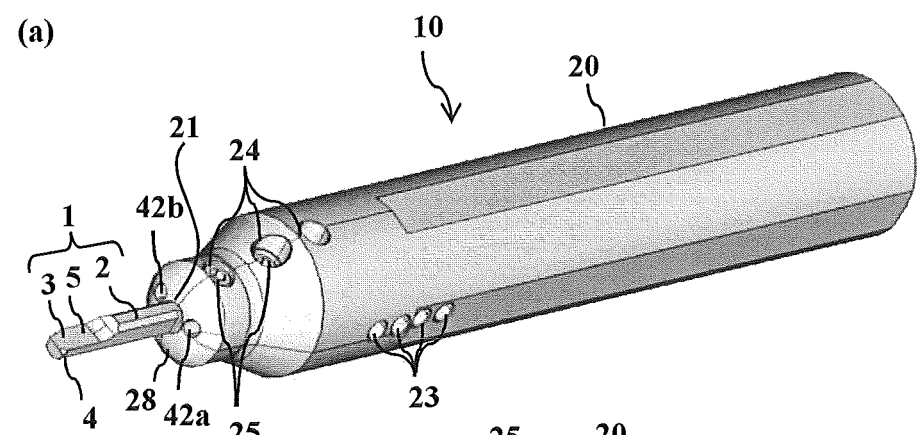
FIG. 4(a) is perspective view of the cutting tool in which the cutting insert has been attached to the holder in this embodiment.
FIG. 4(b) is a side transparent view of the cutting tool.
FIG. 4(c) is a view of the cutting tool when viewed from its front end.
Figure 4:
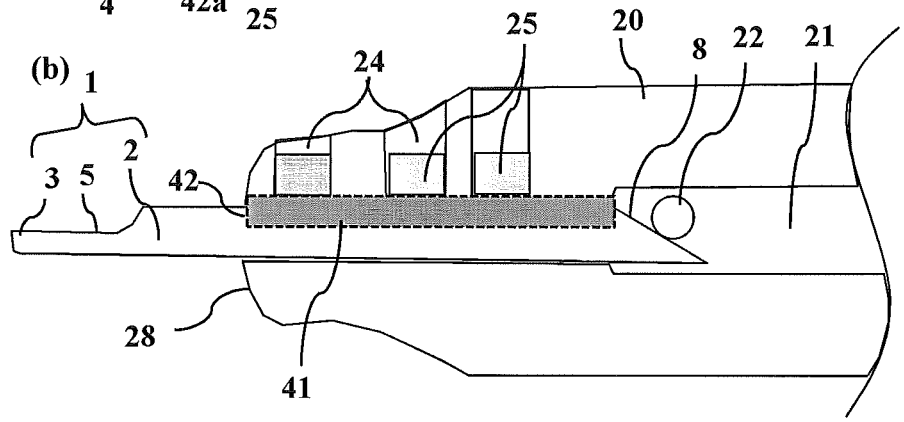
Figure 4:
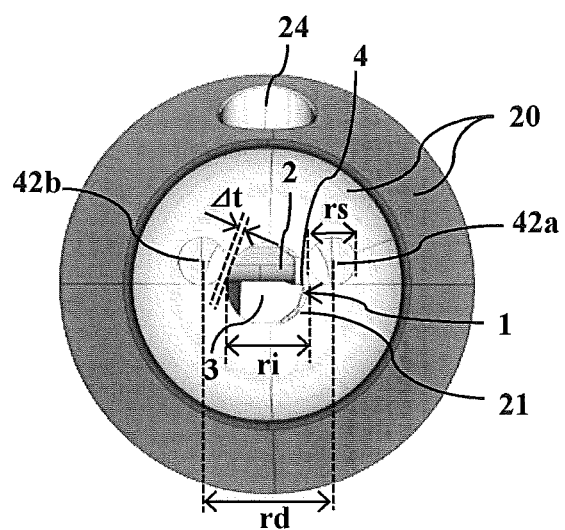
Figure 5:
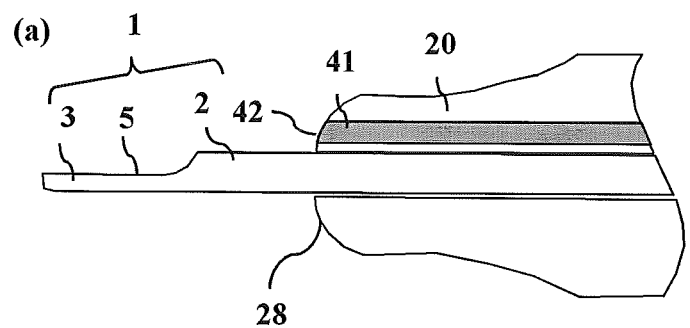
FIG. 5(a) is an enlarged side transparent view of main elements of a cutting tool in which the cutting insert has been attached to another holder in this embodiment and FIG. 5(b) is an enlarged side transparent view of main elements of a cutting tool in which the cutting insert has been attached to yet another holder in this embodiment.
Figure 5:
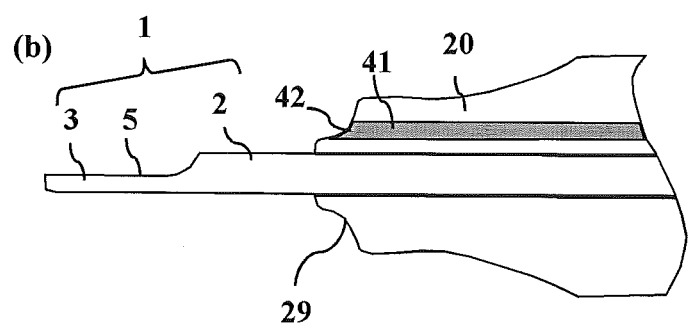
Figure 6:
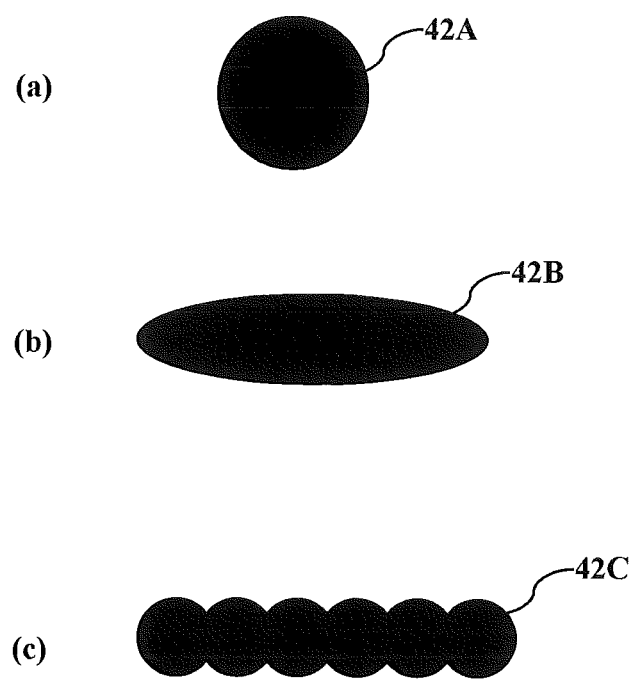
FIG. 6 schematically illustrates other embodiments of the opening in FIG. 4.
Figure 7:
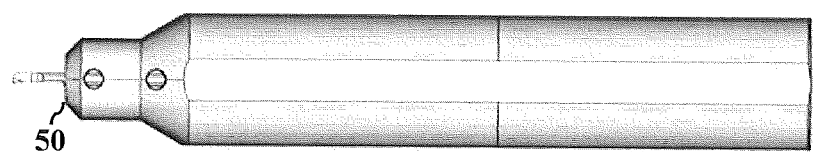
FIGS. 7(a) and 7(b) illustrate two types of conventional cutting tools.
Figure 7:
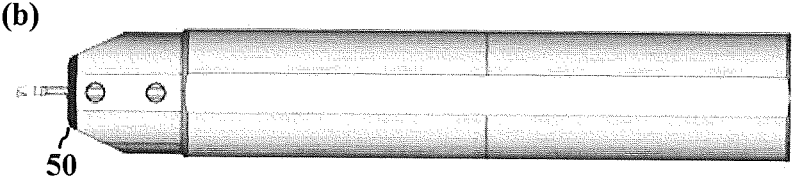

A coolant hole 41 may be formed in the holder 20 as illustrated in FIGS. 4 to 6. When the coolant hole 41 is located closer to the outside than the first curved surface part 28 is, a flow of the coolant supplied from the coolant hole 41 is improved by the first curved surface part 28. Even if the coolant hole 41 is present in the first curved surface part 28, the coolant supplied from the coolant hole 41 is efficiently supplied to the cutting edge part 3 of the cutting insert 1. Even if another coolant is additionally supplied, separately from the coolant hole 41, from closer to the outside than the first curved surface part 28 is, a flow of the coolant supplied from the outside can be improved. The coolant hole 41 is preferably formed in a direction in which the cutting edge ridge 4 is formed or a direction opposite to that direction or at two positions in both directions from the viewpoint that the coolant 15 can be further efficiently supplied.

In FIG. 4, the coolant hole 41 is formed at two positions in a direction in which the cutting edge ridge 4 of the first curved surface part 28 is formed and a direction opposite to that direction. In other words, the coolant holes 41 are formed on the same side as the rake face 5 of the cutting insert 1. In FIG. 4, two openings (ejection holes) 42 of coolant holes 41 are individually formed independently of the insertion hole 21 when viewed from the front end and the centers of the two openings 42 are located above the center of the insertion hole 21. Accordingly, as illustrated in FIGS. 5(a) and 5(b), the opening 42 is formed so that the position of its upper edge and lower edge is not aligned; the upper edge is positioned backward and the lower edge is positioned forward. When the coolant (cutting fluid) is supplied from the holder 20 toward the cutting insert 1, this shape upwardly corrects the direction of the flow of the coolant ejected from the opening 42. As a result, it becomes possible to reduce an amount by which the direction of the flow of the coolant is shifted downwardly due to the gravity.

If a hole to be formed in a work material by inside diameter machining is a blind hole, which has a bottom, the coolant supplied from the upper side of the cutting insert 1 passes through the lower side of the cutting insert 1 and is ejected to the outside of the machined hole in the work material, so the coolant is well circulated. Accordingly, it becomes possible to smoothly eject cutting chips created during cutting to the outside of the system.

Although, in this embodiment, the front end part of the holder 20 has the first curved surface part 28, which is outwardly convex when viewed from its side, as illustrated in FIGS. 4(a) and 5(a), this is not a limitation. That is, as illustrated in FIG. 5(b), the front end part may have a concave curved surface part 29, which is outwardly concave when viewed from its side. In this case, a displacement between the upper side of the opening 42, which is backward, and its lower side, which is forward, is larger when compared with FIG. 5(a), more upwardly correcting the direction of the flow of the coolant ejected from the opening 42. Accordingly, it becomes possible to further reduce an amount by which the direction of the flow of the coolant is shifted downwardly due to the gravity.

In this embodiment, the ratio (rs/ri) of the diameter rs of the opening 42 to the diameter ri of the opening 21a of the insertion hole 21 is 0.2 to 3. At this ratio, the coolant can be efficiently supplied to the cutting edge part 3 of the cutting insert 1. A desirable range of the ratio (rs/ri) is 0.25 to 2. In this embodiment, the diameter rs of openings 42a and 42b is 1.5 to 5 mm. In this embodiment, the diameter rs of the openings 42a and 42b differs from the diameter ri of the opening 21a of the insertion hole 21. When the cutting insert 1 is inserted into the insertion hole 21, therefore, it is possible to prevent the cutting insert 1 from being inserted mistakenly into the opening 42.

Furthermore, as the shape of the opening 42, a circle 42A as illustrated in FIG. 6(a), an ellipse 42B as illustrated in FIG. 6(b), and a shape 42C in which a plurality of circles overlap and are aligned as illustrated in FIG. 6(c) are applicable. In these shapes, the coolant hole 41 and opening 42 can be formed by boring. Particularly, the circle 42A in FIG. 6(a) enables simple boring.

In this embodiment, the ratio rd/(ri+rs) of the distance rd between the centers of the two openings 42a and 42b that are the most apart from each other to the sum (ri+rs) of the diameter ri of the opening 21a of the insertion hole 21 and the diameter rs of the opening 42 is 0.8 to 1.2. This distance is enough for part of an ejected coolant and part of another ejected coolant to join together and for the joined coolant to be more efficiently supplied to the cutting edge part 3. Although, in this embodiment, the openings 42a and 42b are symmetrically located with respect to a vertical line passing through the center of the insertion hole 21 when viewed from the front end, the locations of the openings 42a and 42b are not limited to this line symmetry. If three or more openings 42 are formed on the same side as the rake face 5 of the cutting insert 1, it suffices to take, as rd, the distance between the centers of the two coolant holes 41 that are the most apart from each other.

In FIG. 1, an inclined surface 8 is formed behind the back end of the cutting insert 1 and a positioning member 22, which extends in a direction perpendicular to the longitudinal direction of the insertion hole 21, is provided in the holder 20. To position the inclined surface 8, it is made to abut the positioning member 22. In this structure, the cutting edge ridge 4 of the cutting insert 1 can be easily positioned with high precision in its longitudinal direction and rotational direction.

In FIG. 1, many positioning member attachment holes 23 used to insert the rod-like positioning member 22 are formed in the side of the holder 20. The positioning member 22 has been inserted into one positioning member attachment hole 23 of these positioning member attachment holes 23. The reason why many positioning member attachment holes 23 are formed is to form a structure in which an amount by which the cutting insert 1 protrudes can be appropriately adjusted. The positioning member 22 only needs to be a member that abuts the inclined surface 8 of the cutting insert 1, such as, for example, a pin or a screw member. If the positioning member 22 is shaped like a rod, its shape may be a cylinder, a prism such as a triangular prism, or any other shape; there is no particular limitation. If the positioning member 22 is a pin, it can be easily inserted and removed, enabling easy adjustment of an amount by which the cutting insert 1 protrudes. In this embodiment, therefore, a pin is used as the positioning member 22.

Methods of securing the positioning member 22 includes a method in which both ends of a cylindrical pin are clamped by screws to secure the pin, a method in which one end of a cylindrical pin is threaded and the threaded portion is screwed in the threaded portion of the holder 20, a method in which one end of a cylindrical pin is tapered so as to have an increase diameter and the tapered portion is made to abut a prescribed position of the positioning member attachment hole 23 to secure the pin, a method in which a cylindrical pin is secured by an adhesive, and a method in which a screw member is screwed from the side of a cylindrical pin to secure the pin. In FIG. 1, to secure a cylindrical pin (the positioning member 22), a method is used in which a screw member 27 is inserted from the side of the cylindrical pin, and is screwed in a threaded hole 26, which has been formed in the upper surface of the holder 20 in advance, until the screw member 27 abuts the positioning member 22.

The position of the positioning member 22 in the insertion hole may be appropriately adjusted according to the insertion angle of the inclined surface 8 of the cutting insert 1. Abutting is performed so that the inclined surface 8 of the cutting insert 1 and the positioning member 22 make a linear contact, but if the positioning member 22 is, for example, a cylindrical pin, an arrangement is made so that a direction perpendicular to the longitudinal direction of the inclined surface 8 and a direction perpendicular to the longitudinal direction of the holder 20 on the outer circumference of the positioning member 22 become parallel to each other when the cutting insert 1 is attached to the holder 20. This achieves a stable and firm constraint.

In FIG. 1, to suppress the cutting insert 1 from coming off or raffling, the screw hole 24 passing through the insertion hole 21 from the outer circumference of the holder 20 is formed at a position closer to the front end side of the holder 20 than the positioning member 22 is, the screw member 25 is screwed in the screw hole 24, and the outer circumferential surface of the shank part 2 of the cutting insert 1 is pressed at the front end of the screw member 25 to secure the cutting insert 1, besides the positioning member 22. At that time, the outer circumferential surface of the shank part 2, which abuts the screw member 25, may be a curved surface, but the outer circumferential surface is preferably a flat surface with an inclination of ±1 degree or less with respect to a direction perpendicular to the direction of progress of the screw member 25. That is, when the curved surface of the shank part 2 abuts the screw member 25, positioning precision in attachment is high because the cutting insert 1 is attached without being rotated due to an effect by variations in manufacturing. If the shank part 2 has a flat surface with an inclination of ±1 degree or less, however, the rotation of the cutting insert 1 can be suppressed by adjusting a degree at which the screw member 25 is tightened and tightening strength is improved when compared with the curved surface.

By referring to FIG. 1, a structure in which the inclined surface 8 is used to position the cutting insert 1 has been described, but the present invention is not limited to this structure. For example, the back end may abut the screw member inserted from the back of the holder 20 in a plane perpendicular to the longitudinal direction of the insertion hole 21 and the side may be secured by a screw. Alternatively, a cutting edge part that makes a pair may be provided at the back end.

REFERENCE SIGNS LIST 1 insert
2 shank part
3 cutting edge part
4 cutting edge ridge
10 cutting tool
15 coolant
16 cutting chip
20 holder
21 insertion hole
22 positioning member
23 positioning member attachment hole
24, 26 screw hole
25, 27 screw member
28 first curved surface part
29 straight line part
30 second curved surface part
31 groove part
40 angular part
$L_1$ width of straight line part
$L_2$ maximum width of holder

What is claimed is:

1. A holder for receiving and fixing a cutting insert, wherein:
   the holder comprises an insertion hole at a front end part of the holder;
   said front end part comprises;
   a first chip control curved surface part that becomes wider from a front end toward a back side when viewed from a side thereof; and
   a second chip control surface part that extends outwardly from an entire periphery of the first chip control curved surface part and that is outwardly concave when viewed from a side thereof;
   the first chip control curved surface part comprises i) a curved line that extends from an edge of an opening of the insertion hole toward the back side; or ii) a straight line that extends from the edge of the opening of the insertion hole and connects to a curved line that extends continuously from the straight line toward the back side without an angular part.

2. The holder according to claim 1, wherein the holder has substantially a rod-shape; and a width of the straight line of the first chip control curved surface part is a half or less of a maximum width of the holder.

3. The holder according to claim 1, wherein an outermost shape of the first chip control curved surface part at the front end part is substantially circular when viewed from the front end, and a ratio of a curvature radius of a curved line of the first chip control curved surface part to a radius at the outermost shape of the first curved surface part is 0.2 to 1.

4. The holder according to claim 1, further comprising a coating layer on at least a surface of the first chip control curved surface part.

5. The holder according to claim 1, further comprising a third curved surface part disposed on a back side of the first chip control curved surface part.

6. The holder according to claim 1, wherein the first chip control curved surface part comprises a groove part thereon, and a virtual line extending from the groove part toward an orientation of the groove part at a front end side thereof crosses an axial line of the holder.

7. The holder according to claim 1, further comprising a coolant hole.

8. The holder according to claim 7, wherein at least two openings of coolant holes are individually formed and separated from the insertion hole when viewed from the front end, and centers of the at least two openings are located on one and the same side with respect to a center of the opening of the insertion hole.

9. The holder according to claim 7, wherein the opening of the coolant hole is formed in the first chip control curved surface part.

10. The holder according to claim 7, wherein a ratio (rs/ri) of a diameter (rs) of the opening of the coolant hole to a diameter (ri) of the opening of the insertion hole is 0.2 to 3.

11. The holder according to claim 7, wherein a shape of the opening of the coolant hole is a circle, an ellipse, or a shape in which ends of a plurality of circles overlap and are aligned in a line.

12. The holder according to claim 8, wherein a ratio rd/(ri+rs) is 0.8 to 1.2, where rd is a distance between centers of two coolant holes that are the furthest apart from each other among the at least two coolant holes, ri is a diameter of the opening of the insertion hole, and rs is a diameter of the opening of the coolant hole.

13. A cutting tool comprising:
a holder according to claim 1;
a cutting insert comprising:
a shank part having a substantially rod shape, and comprising a first end portion and a second end portion, wherein the first end portion is opposite to the second end portion and located inside the insertion hole; and
a cutting edge part extending from the second end portion and located outside the insertion hole.

14. A cutting tool comprising:
a holder according to claim 12;
a cutting insert comprising:
a shank part having a substantially rod shape, and comprising a first end portion and a second portion, wherein the first end portion is opposite to the second end portion and located inside the insertion hole; and
a cutting edge part extending from the second end portion and located outside the insertion hole; wherein
the cutting edge part comprises a cutting edge and a rake face; and the one and same side with respect to the opening of the insertion hole is on the same side with respect to the center of the opening of the insertion hole than the side where the rake face is provided with respect to the center of the opening of the insertion hole.

\* \* \* \* \*